US009582930B2

(12) United States Patent
Chen et al.

(10) Patent No.: US 9,582,930 B2
(45) Date of Patent: Feb. 28, 2017

(54) TARGET AQUISITION IN A THREE DIMENSIONAL BUILDING DISPLAY

(75) Inventors: Henry Chen, Beijing (CN); Tom Plocher, Hugo, MN (US); Conrad B. Beaulieu, Duluth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 288 days.

(21) Appl. No.: 14/366,245

(22) PCT Filed: Dec. 12, 2011

(86) PCT No.: PCT/CN2011/084974
§ 371 (c)(1),
(2), (4) Date: Jun. 17, 2014

(87) PCT Pub. No.: WO2013/097161
PCT Pub. Date: Jul. 4, 2013

(65) Prior Publication Data
US 2014/0327670 A1 Nov. 6, 2014

(51) Int. Cl.
*G06T 17/00* (2006.01)
*G06T 19/00* (2011.01)
(Continued)

(52) U.S. Cl.
CPC .......... *G06T 17/00* (2013.01); *G06F 3/04815* (2013.01); *G06T 3/40* (2013.01);
(Continued)

(58) Field of Classification Search
CPC .. G06F 17/5004; G06F 3/04842; G06F 17/50; G06F 2217/02; G06F 3/04847;
(Continued)

(56) References Cited

U.S. PATENT DOCUMENTS 5,588,098 A * 12/1996 Chen ................... G06F 3/04845
345/653
6,636,244 B1 * 10/2003 Kelley ................ G06F 3/04842
715/781
(Continued)

FOREIGN PATENT DOCUMENTS

| CN | 101763656 A | 6/2010 |
| CN | 101908232 A | 12/2012 |
| KR | 100898262 B1 | 5/2009 |

OTHER PUBLICATIONS

Elmqvist, Niklas, and Jean-Daniel Fekete. "Semantic pointing for object picking in complex 3D environments." Proceedings of Graphics Interface 2008. Canadian Information Processing Society, 2008.*

(Continued)

*Primary Examiner* — Sultana M Zalalee
(74) *Attorney, Agent, or Firm* — Brooks, Cameron & Huebsch, PLLC

(57) ABSTRACT

The present disclosure provides methods, devices, and computer-readable media for target acquisition in a three dimensional building display are described herein. One or more embodiments include extracting building information modeling semantic data of each of a number of modeled objects in a visual scene of a three dimensional building display, determining a semantic space for each of the number of modeled objects based, at least in part, on the building information modeling semantic data, adjusting a scale factor of the three dimensional building display based, at least in part, on the semantic space of each of the number of modeled objects, and acquiring a target of at least one of the modeled objects using the adjusted scale factor.

19 Claims, 2 Drawing Sheets

(51) Int. Cl.
    *G06T 3/40* (2006.01)
    *G06F 3/0481* (2013.01)
(52) U.S. Cl.
    CPC .. *G06T 19/003* (2013.01); *G06F 2203/04806* (2013.01); *G06T 2200/08* (2013.01); *G06T 2200/24* (2013.01)
(58) Field of Classification Search
    CPC ...... G06F 21/00; G06F 2217/06; G06F 3/011; G06F 3/04815; G06F 17/5009; G06F 17/5072; G06F 17/5081; G06T 2210/04; G06T 17/00; G06T 19/00; G06T 19/20; G06T 2210/12
    See application file for complete search history.

(56) References Cited

U.S. PATENT DOCUMENTS

| | | | |
|---|---|---|---|
| 7,545,362 B2* | 6/2009 | Kong | G06F 3/0338 345/158 |
| 2002/0126131 A1 | 9/2002 | Davis | |
| 2003/0117405 A1* | 6/2003 | Hubrecht | G06T 17/00 345/543 |
| 2004/0172588 A1* | 9/2004 | Mattaway | H04L 12/1822 715/201 |
| 2004/0236640 A1* | 11/2004 | Kassan | G06F 17/30899 705/14.4 |
| 2005/0289467 A1 | 12/2005 | Imhof et al. | |
| 2007/0219645 A1 | 9/2007 | Thomas et al. | |
| 2008/0007567 A1* | 1/2008 | Clatworthy | G06Q 30/02 345/619 |
| 2010/0149097 A1* | 6/2010 | Jung | G06F 3/03547 345/166 |
| 2011/0029897 A1 | 2/2011 | Russell | |
| 2011/0175830 A1* | 7/2011 | Miyazawa | G06F 1/1643 345/173 |

OTHER PUBLICATIONS

Search Report and Written Opinion from related European Application EP11878825 dated Sep. 25, 2015, 7 pp.

First Chinese Office Action from related PCT Application No. PCT/CN2011/084974, dated Apr. 21, 2016, 20 pp.

Second Office Action from related Chinese Patent Application No. 201180076123, dated Nov. 16, 2016, 13 pp.

* cited by examiner

TARGET AQUISITION IN A THREE DIMENSIONAL BUILDING DISPLAY

This application is a National Stage Application under 35 U.S.C. §371 of International Application Number PCT/CN2011/084974, filed Dec. 30, 2011 and published as WO 2013/097161 on Jul. 4, 2013, the entire contents of which are incorporated herein by reference in its entirety.

TECHNICAL FIELD

The present disclosure relates to devices and methods of target acquisition in a three dimensional building display.

BACKGROUND

Three dimensional (3D) based applications can be used in many applications that traditional two dimensional (2D) applications are used. Further, stereoscopic 3D display device can allow observers to realize depth perception of objects so that they can appear in a natural way (e.g., more realistic than traditional 2D displays). In both 2D and 3D displays selection of objects (e.g., target acquisition) can be a fundamental task of interaction with the display.

DETAILED DESCRIPTION

Figure 1:
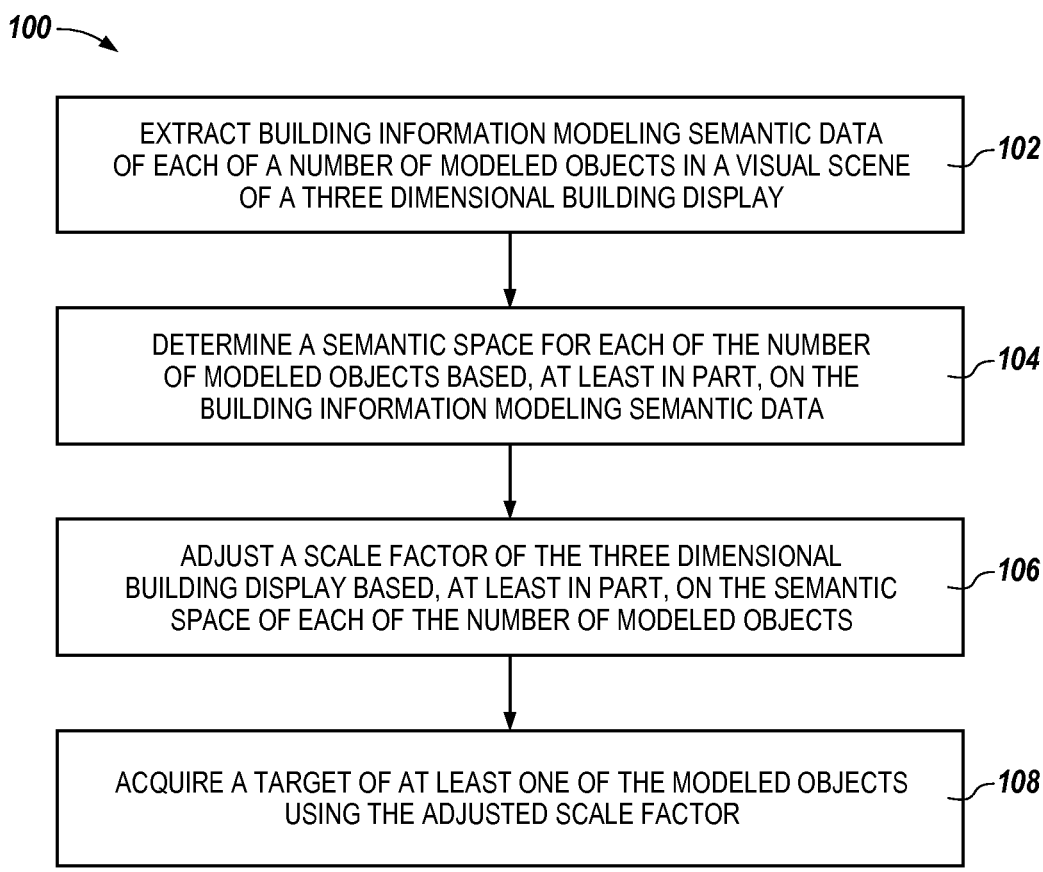
FIG. 1 illustrates a method for target acquisition in a three dimensional building display in accordance with one or more embodiments of the present disclosure.

The present disclosure provides methods, devices, and computer-readable media for target acquisition in a three dimensional building display. One or more embodiments include extracting building information modeling semantic data of each of a number of modeled objects in a visual scene of a three dimensional building display, determining a semantic space for each of the number of modeled objects based, at least in part, on the building information modeling semantic data, adjusting a scale factor of the three dimensional building display based, at least in part, on the semantic space of each of the number of modeled objects, and acquiring a target of at least one of the modeled objects using the adjusted scale factor.

Embodiments according to the present disclosure provide 3D building displays. The 3D building displays can be manipulated such that a device, room, floor and/or building may be displayed. The 3D building display can, for example, be transitioned from one view to another, different view. For example, if a building is shown on the 3D building display, a zoom feature may be employed such that a floor of the building is shown on the 3D building display.

According to the present disclosure objects displayed on the 3D building display may be acquired. Some embodiments of the present disclosure can provide building information modeling (BIM) semantic data when an object (e.g., target) is selected (e.g., acquired) in a three dimensional (3D) display. A target can include, for example, an object displayed in a 3D scene. For example, a target can include, but is not limited to, a light fixture, a heating, ventilation, and air conditioning (HVAC) unit, a security device, and/or combinations thereof, etc.

Three dimensional displays with a number of targets can, however, suffer from targets that may occlude one another. For example, a 3D display may contain an HVAC device that, because of its larger size, occludes a light switch. Embodiments of the present disclosure can make use of BIM semantic data to aid in target acquisition of occluded objects as compared to previous approaches.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

As used herein, "a" or "a number of" something can refer to one or more such things. For example, "a number of differences" can refer to one or more differences.

FIG. 1 illustrates a method 100 for target acquisition in a three dimensional building display in accordance with one or more embodiments of the present disclosure. The method can be performed by, for example, the device further described herein in connection with FIG. 2.

The method 100 includes extracting building information modeling (BIM) semantic data of each of a number of modeled objects in a visual scene of a three dimensional (3D) building display at 102. BIM semantic data can include, but is not limited to, data of an object, such as geometry, spatial relationships, logical relationships, geographic information, quantities, manufacturer properties, programmable settings, and/or combinations thereof, etc. BIM semantic data can also include a class or category of objects to which the selected object belongs (e.g., Industry Foundation Class (IFC)). The BIM semantic data can be extracted from a server internal to a business and/or external to a business. Extraction of BIM semantic data can include creating a displayable link to the BIM semantic data of an object.

Figure 2:
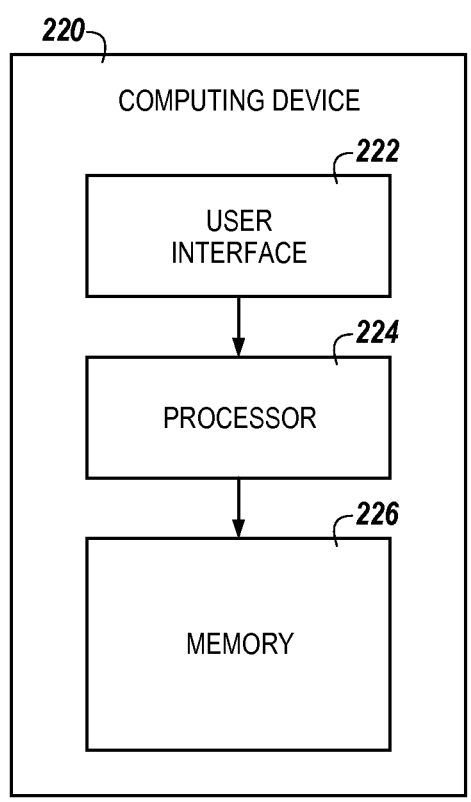
FIG. 2 illustrates a computing device for target acquisition in a three dimensional building display in accordance with one or more embodiments of the present disclosure.

A visual scene can include a 3D display of an interaction mode on a graphical user interface (GUI) as further discussed herein in connection with FIG. 2.

At 104, the method 100 includes determining a semantic space for each of the number of modeled objects based, at least in part, on the building information modeling (BIM) semantic data. The semantic space can include, for example, object spatial features such as geometry, spatial relationship to other objects and/or within a view category, and/or geographic information of the modeled object and/or the category or class of the object.

A scale factor of the three dimensional building display is adjusted based, at least in part, on the semantic space of each of the number of modeled objects at 106. A scale factor can include, for example, a factor corresponding to the distance a pointer in the 3D display moves in relation to the distance a peripheral device moves. Examples of a peripheral device include pointing devices such as, but not limited to, a mouse, a trackball, a joystick, a pointing stick, a graphics tablet, a stylus, a touchpad, a touch screen, a light pen, an eye tracking device, a hand or gesture tracking device and/or combinations thereof, etc.

In some embodiments, adjusting the scale factor of the 3D building display includes increasing the scale factor when the number of objects in the visual scene is below a threshold value. For example, if the threshold value is 25 objects and the visual scene of the 3D display displays 15 objects, the scale factor can be increased. Increasing the scale factor can, for example, cause the pointer to move a greater distance in the 3D display for a constant distance traveled by the peripheral device. That is, the peripheral device becomes more sensitive.

In some embodiments, adjusting the scale factor of the 3D building display can include decreasing the scale factor when the number of modeled objects in the visual scene is above a threshold value. For example, if the threshold value is 25 objects and the visual scene of the 3D display displays 45 objects, the scale factor can be decreased. Decreasing the scale factor can, for example, cause the pointer to move a shorter distance in the 3D display for a constant distance traveled by the peripheral device. That is, the peripheral device becomes less sensitive.

Alternatively, and/or additionally, adjusting the scale factor of the 3D display can be based, at least in part, on a category of the visual scene. A category of a visual scene can include, for example, a building view display, a floor plan view display, a room view display, and/or a device view display. As discussed herein, a category of the visual scene may include an interaction mode.

The method 100 includes acquiring a target of at least one of the modeled objects using the adjusted scale factor at 108. Acquiring a target can include, for example, selecting the target with a pointer, highlighting the target, hovering over the target with the pointer, and/or combinations thereof, etc.

In some embodiments, the method can include determining interaction context information based on the number and category of modeled objects in the visual scene. Interaction context information can include, for example, a category of a visual scene and/or the interaction of the pointer with the display. For example, if the visual scene has less than 10 objects, the method can zoom in on those 10 displayed objects, as discussed herein. A category can include, but is not limited to a user defined category, an IFC, and/or combinations thereof, etc. IFC information can be extracted, for example, with the BIM semantic data.

In some examples, interaction context information can aid a user in acquiring a target. For example, depending on the interaction mode of the 3D building display, a certain category of objects may be capable of being selected and a certain category of objects may not be capable of being selected. For example, if the 3D building display is in a room level view interaction mode and the pointer is targeting an air handler object (e.g., thermostat) but is off slightly and is actually on a wall of the display room, the air handler object may still be selected. That is, a wall of a room may not be a category of object that can be selected in a room view interaction mode. However, due to the pointer's proximity to the air handler object, a category of object selectable in the room view interaction mode, the air handler object may still be selected.

In some examples, interaction context information may also be used to determine a subset of objects to display. For example, if a pointer is attempting to select an air handler object, the 3D display can use the interaction context information to also display duct work.

Acquiring a target can include selecting an appointed target based on a bounding box. An appointed target can, for example, be a target of the 3D display that may lend itself for selection in a particular interaction mode. For example, a floor of the 3D building display can be an appointed target in the building view mode. Similarly, a room can be an appointed target in the floor view mode. A bounding box, can include, a box (e.g., a rectangular parallelepiped) for a set of objects that includes each object within the box.

An appointed target can include a bounding box of number of objects. For example, in the building-level view mode, a floor can be displayed by a bounding box including each of the number of objects of the floor, and then the floor can be selected to display the floor view interaction mode of that floor.

A number of embodiments can, for example, include providing an additional visual scene of the three dimensional building display based, at least in part, on the interaction context for each of the number of modeled objects. For example, based on the interaction of the pointer with a building display view mode the method can provide a floor plan view mode. The additional visual scene can be provided, for example, via a transition to the additional visual scene, as discussed herein in connection with FIG. 2.

In some embodiments, providing the additional visual scene can include providing BIM modeling semantic data of each of a number of modeled objects in the additional visual scene.

FIG. 2 illustrates a computing device 220 for target acquisition in a three dimensional building display in accordance with one or more embodiments of the present disclosure. Computing device 220 can be, for example, a desktop computing device, a laptop computing device, or a portable handheld computing device, such as, for instance, a portable handheld mobile phone, media player, and/or combinations thereof, etc. However, embodiments of the present disclosure are not limited to a particular type of computing device.

As shown in FIG. 2, computing device 220 includes a user interface 222. User interface 222 can be a graphic user interface (GUI) that can provide (e.g., display and/or present) and/or receive information (e.g., data and/or images) to and/or from a user (e.g., operator) of computing device 220. For example, user interface 222 can include a screen that can provide information to a user of computing device 220 and/or receive information entered into a display on the screen by the user. However, embodiments of the present disclosure are not limited to a particular type of user interface.

As shown in FIG. 2, computing device 220 includes a processor 224 and a memory 226 coupled to the processor 224. Memory 226 can be volatile or nonvolatile memory. Memory 226 can also be removable (e.g., portable) memory, or non-removable (e.g., internal) memory. For example, memory 226 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 226 is illustrated as being located in computing device 220, embodiments of the present disclosure are not so limited. For example, memory 226 can also be located internal to another computing resource (e.g., enabling computer readable instructions to be downloaded over the Internet or another wired or wireless connection).

Memory 226 can also store executable instructions, such as, for example, computer readable instructions (e.g., software), for target acquisition in a three dimensional building display in accordance with one or more embodiments of the present disclosure.

Processor 224 can execute the executable instructions stored in memory 226 for target acquisition in a three dimensional building display in accordance with one or more embodiments of the present disclosure. For example, processor 224 can execute the executable instructions stored in memory 226 to display a number of objects of a three dimensional building display in an interaction mode.

An interaction mode can include at least one of the visual scenes as discussed herein. For example, an interaction mode can include a building view mode, a floor plan view mode, a room view mode, and/or a device view mode. For example, a building view interaction mode can include a 3D display of a building, objects associated with the display of the building, and/or BIM semantic data of each associated object.

In some embodiments, the interaction mode can include a rotate function, a zoom function, and/or a pan function. The rotate function can include, for example, rotating the 3D display around an object. The zoom function can include, for example, zooming in on an object. The pan function can include, for example, repositioning the focus on different objects and/or areas of the 3D display.

In some embodiments, the instructions can be executed to adjust a scale factor of the interaction mode between a visual space and a motor space. The motor space can include the travel path and/or speed of the pointer within the interaction mode. The visual space can include the space between objects, within objects, around objects, and/or combinations thereof, etc.

In some embodiments, the interaction mode is the floor plan view mode and the instructions can be executed to display, in the floor plan view mode, a number of rooms of the 3D building and identify, in the floor plan view mode, a number of properties of a highlighted room of the number of rooms.

In some embodiments, the interaction mode is the building view mode and the instructions can be executed to zoom in on a floor in the 3D display and switch the 3D display to a display of the floor upon zooming in on the floor in the 3D building display.

In some embodiments, the interaction mode is the floor plan view mode and the instructions can be executed to zoom in on a room in the 3D building display and switch the 3D display to a display of the room upon zooming in on the room in the 3D building display.

In some embodiments, the instructions can be executed to rotate the display based at least in part on the room and decrease the scale factor from a size of the room and a size of the number of objects.

The instructions can, for example, be executed to extract building information modeling (BIM) semantic data of at least one of the number of displayed objects. The BIM semantic data can be extracted prior to or upon target acquisition. For example, each displayed object may, upon acquisition, display links to BIM information and/or display the BIM information on the 3D display.

In some embodiments, the instructions can be executed to acquire a target of the at least one of the number of displayed objects, as described herein.

In some embodiments, the instructions can be executed to determine if the acquired target triggers a transition to a different interaction mode. For example, if the 3D display is in the room view interaction mode and a target is acquired such as a lighting switch, the 3D display can transition to a device view mode of that acquired lighting switch.

According to the present disclosure, the additional interaction mode can be a different interaction mode than the interaction mode.

In some embodiments, the transition can include at least one of the group include a transition from a building view mode to a floor plan view mode, a transition from a floor plan view mode to a room view mode, a transition from a room view mode to a device view mode, a transition from a device view mode to a room view mode, a transition from a room view mode to a floor plan view mode, and a transition from a floor plan view mode to a building view mode.

In some embodiments, the instructions can be executed to analyze a number of actions performed within the display and render a subsequent visual scene based on the analyzed number of actions and the deduced context information. For example, if, when in a floor plan view interaction mode, particular attention (e.g., a zoom function, a pan function, etc.) is given to an office section of the displayed floor, a room view mode can be rendered.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is Claimed:

1. A method for target acquisition in a three dimensional building display, comprising:
    extracting building information modeling semantic data of each of a number of modeled objects in a visual scene of a three dimensional building display;
    determining a semantic space for each of the number of modeled objects based, at least in part, on the building information modeling semantic data;
    adjusting a scale factor of the three dimensional building display based, at least in part, on the semantic space of each of the number of modeled, wherein adjusting the scale factor of the three dimensional building display includes decreasing the scale factor when the number of modeled objects in the visual scene is above a threshold value; and acquiring a target of at least one of the modeled objects using the adjusted scale factor.

2. The method of claim 1, wherein adjusting the scale factor of the three dimensional building display includes increasing the scale factor when the number of modeled objects in the visual scene is below a threshold value.

3. The method of claim 1, wherein the method includes adjusting the scale factor of the three dimensional building display based, at least in part, on a category of the visual scene.

4. The method of claim 1, wherein the method includes determining interaction context information based on the number and category of modeled objects in the visual scene.

5. The method of claim 4, wherein the method includes providing an additional visual scene of the three dimensional building display based, at least in part, on the interaction context for each of the number of modeled objects.

6. The method of claim 1, wherein the method includes acquiring an appointed target based on a bounding box.

7. A non-transitory computer-readable medium storing instructions for target acquisition in a three dimensional building display, executable by a computer to cause the computer to:
 display a number of objects of a three dimensional building display in an interaction mode;
 adjust a scale factor of the interaction mode between a visual space and a motor space, wherein adjusting the scale factor of the interaction mode includes increasing the scale factor when the number of displayed objects in the interaction mode is below a threshold value;
 extract building information modeling semantic data of at least one of the number of displayed objects;
 acquire a target of at least one of the number of displayed objects including the building information modeling semantic data of the acquired target;
 determine if the acquired target triggers a transition to an additional interaction mode; and
 transition to the additional interaction mode if the acquired target triggers the transition to the additional interaction mode.

8. The non-transitory computer readable medium of claim 7, wherein the interaction mode includes a rotate function, a zoom function, and a pan function.

9. The non-transitory computer readable medium of claim 7, wherein the interaction mode includes an interaction mode from the group including: a building view mode, a floor plan view mode, a room view mode, and a device view mode.

10. The non-transitory computer readable medium of claim 7, wherein the interaction mode is a floor plan view mode and the instructions include instructions executable by the computer to:
 display, in the floor plan view mode, a number of rooms of the three dimensional building; and
 identify, in the floor plan view mode, a number of properties of a highlighted room of the number of rooms.

11. The non-transitory computer readable medium of claim 7, wherein the interaction mode is a building view mode and the instructions include instructions executable by the computer to:
 zoom in on a floor in the three dimensional building display; and
 switch the three dimensional display to a display of the floor upon zooming in on the floor in the three dimensional building display.

12. The non-transitory computer readable medium of claim 7, wherein the interaction mode is a floor plan view mode and the instructions include instructions executable by the computer to:
 zoom in on a room in the three dimensional building display; and
 switch the three dimensional display to a display of the room upon zooming in on the room in the three dimensional building display.

13. The non-transitory computer readable medium of claim 12, wherein the instructions include instructions executable by the computer to:
 rotate the display based, at least in part, on the room; and
 decrease the scale factor from a size of the room and a size of the number of objects.

14. The non-transitory computer readable medium of claim 7, wherein the additional interaction mode is a different interaction mode than the interaction mode.

15. The non-transitory computer readable medium of claim 7, wherein the instructions executable by the computer to transition includes a transition from at least one of the group including:
 a transition from a building view mode to a floor plan view mode;
 a transition from a floor plan view mode to a room view mode;
 a transition from a room view mode to a device view mode;
 a transition from a device view mode to a room view mode;
 a transition from a room view mode to a floor plan view mode; and
 a transition from a floor plan view mode to a building view mode.

16. The non-transitory computer readable medium of claim 7, wherein the instructions executable by the computer to adjust the scale factor are based at least in part on the interaction mode.

17. A computing device for target acquisition in a three dimensional building display, comprising:
 a memory; and
 a processor coupled to the memory, wherein the processor is configured to execute executable instructions stored in the memory to:
  display a number of objects of a three dimensional building display in an interaction mode;
  determine interaction context information based on the number and category of objects;
  adjust a scale factor of the interaction mode between a visual space and a motor space, wherein adjusting the scale factor of the interaction mode includes decreasing the scale factor when the number of displayed objects in the interaction mode is above a threshold value;
  extract building information modeling semantic data of at least one of the number of displayed objects;
  acquire a target of the at least one of the number of displayed objects;
  determine if the acquired target triggers a transition to a different interaction mode; and transition to the different interaction mode if the acquired target triggers the transition to the different interaction mode.

18. The computing device of claim 17, wherein the processor is configured to execute executable instructions stored in the memory to display building information modeling semantic data of a highlighted object of the number of displayed objects.

19. The computing device of claim 17, wherein the processor is configured to execute executable instructions stored in the memory to:
   analyze a number of actions performed within the display; and
   render a subsequent visual scene based on the analyzed number of actions and the deduced context information.

* * * * *